Figure 1:
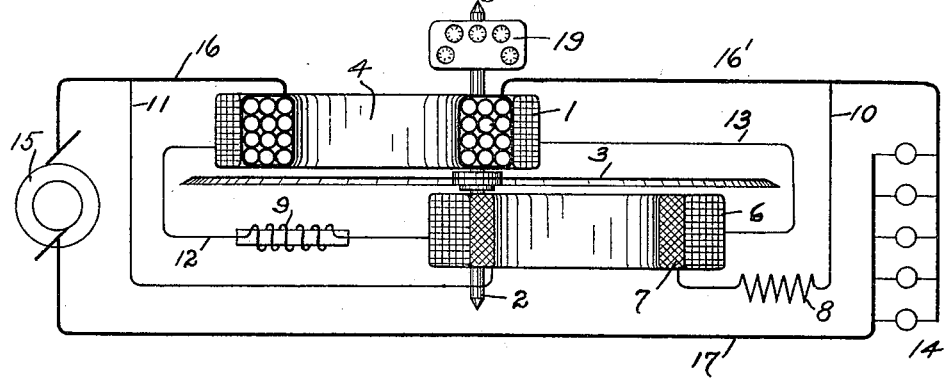

No. 623,523. Patented Apr. 25, 1899.
T. DUNCAN.
ELECTRIC METER.
(Application filed Mar. 16, 1898.)
(No Model.) 3 Sheets—Sheet 1.

Witnesses
Samuel R. Bachtel.
Adelaide Kearns.

Thomas Duncan Inventor
By His Attorneys Chapin & Denny

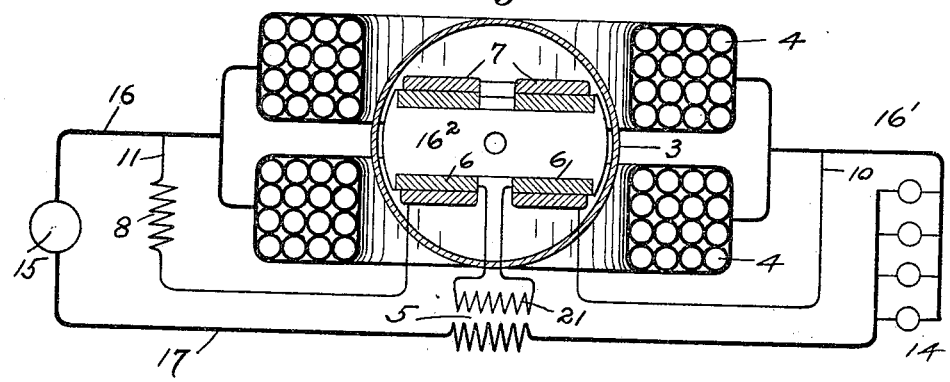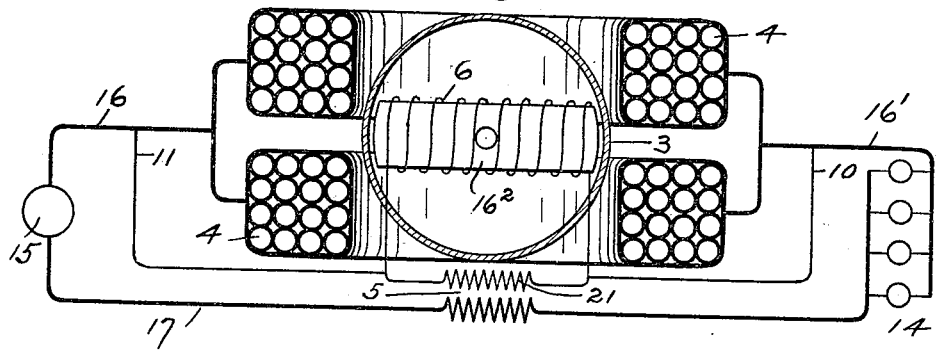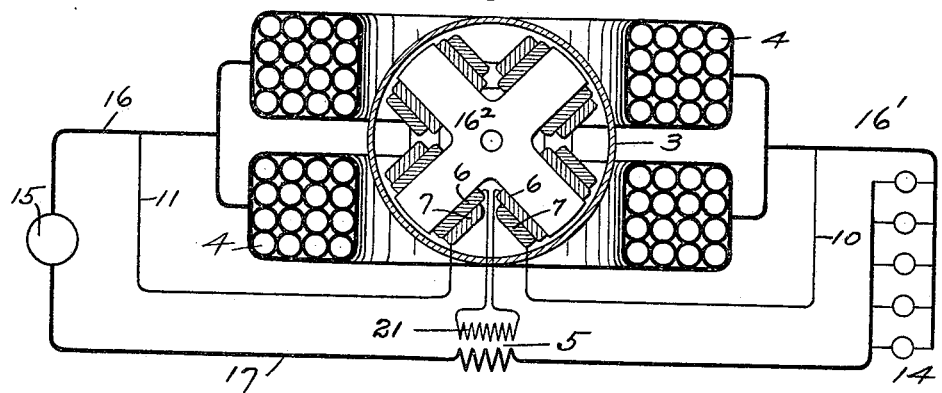

No. 623,523.  
T. DUNCAN.  
ELECTRIC METER.  
(Application filed Mar. 16, 1898.)  
(No Model.)  
Patented Apr. 25, 1899.  
3 Sheets—Sheet 3.

Witnesses  
Samuel R. Bachtel  
Adelaide Kearns

Thomas Duncan Inventor  
By His Attorneys Chapin & Denny

United States Patent Office.

THOMAS DUNCAN, OF FORT WAYNE, INDIANA.

ELECTRIC METER.

SPECIFICATION forming part of Letters Patent No. 623,523, dated April 25, 1899.

Application filed March 16, 1898. Serial No. 674,040. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in electric meters, particularly that class known as "integrating coulomb-meters."

The object of my invention is to provide a coulomb-meter of simple and economical construction possessing great accuracy on small loads, requiring for its operation but a small amount of energy, and having such a construction and arrangement of operative parts as to actuate the revoluble armature without the aid of a pressure or multiple circuit.

The principal novel feature of my present invention resides in the arrangement of the energizing-coils relative to the revoluble armature, whereby two magnetic fields are established differing from each other by ninety degrees and adapted to form a resulting shifting field which actuates the said armature without the employment of a pressure or multiple circuit energized by the two mains of the system.

Similar reference-numerals indicate like parts in the drawings, in which—

Figure 2:
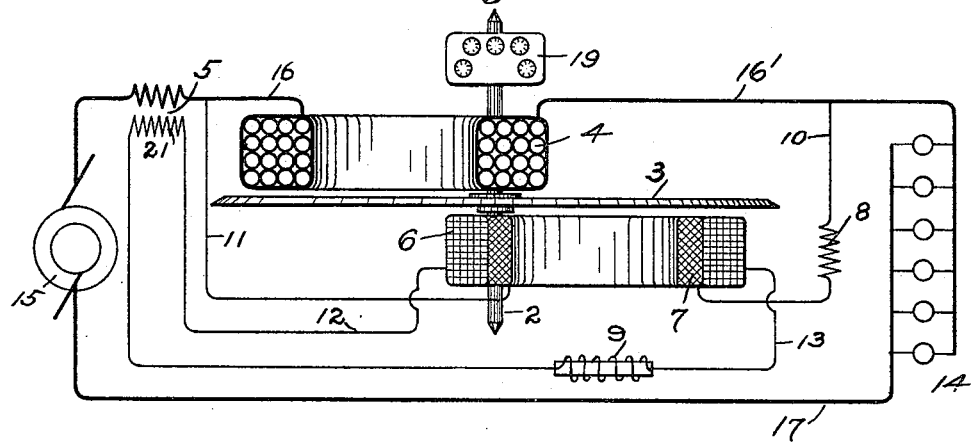
Figure 3:
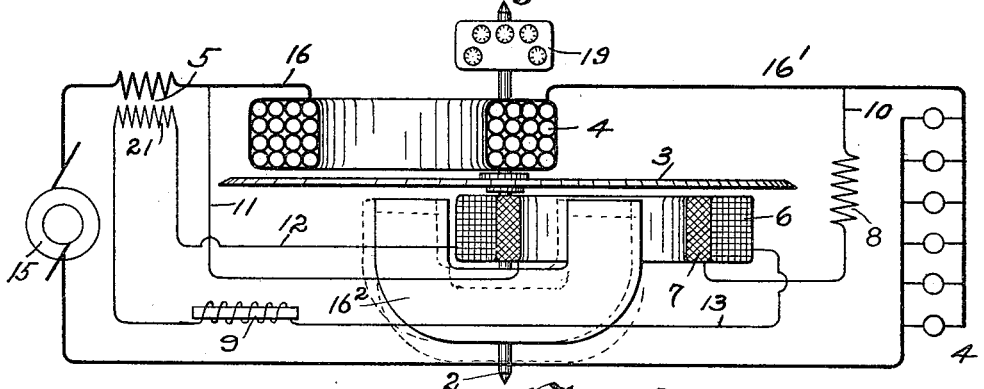
Figure 7:
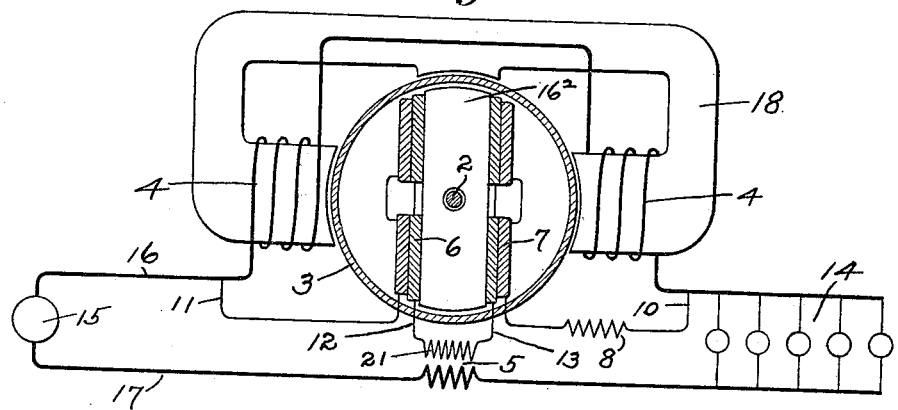
Figure 8:
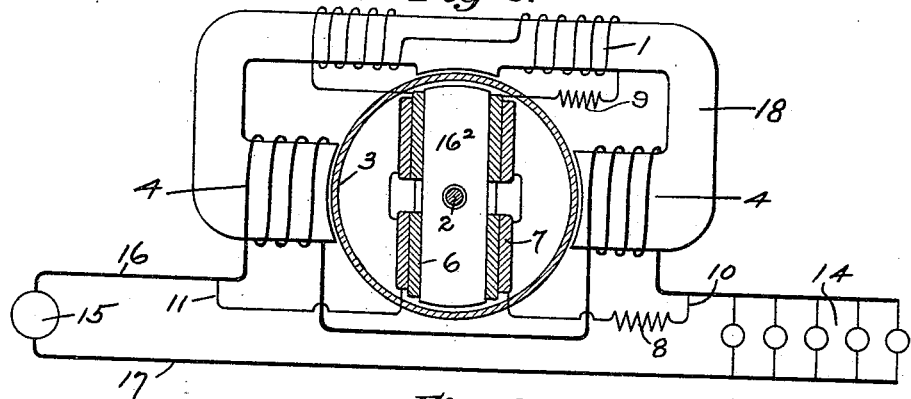
Figure 9:
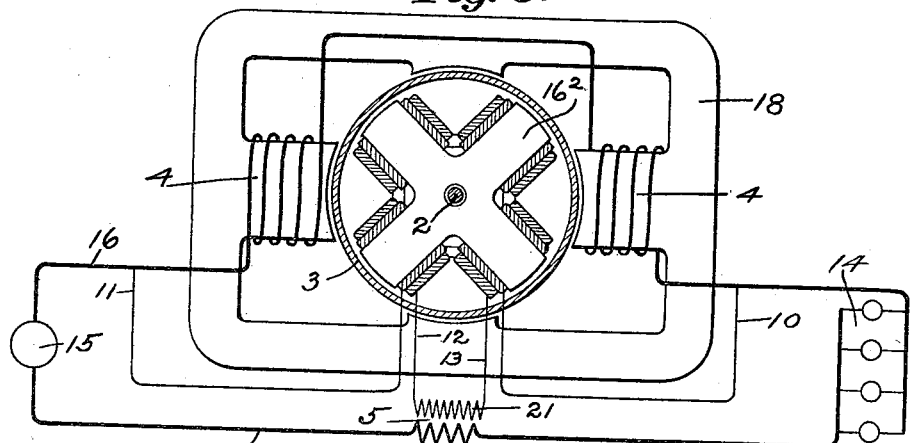

Figures 1, 2, and 3 are vertical central sections of the energizing-coils of my improvement, showing the relative position of the actuating-coils and the disk form of armature, not in section. Figs. 4, 5, and 6 are horizontal sections of a modified form of the same through the energizing-coils and showing a cylindrical form of armature containing other actuating-coils arranged upon an inner core. Figs. 7, 8, and 9 are also horizontal sectional views of my improvement, showing the employment of an iron core inside of the series coils.

My invention consists of a series of energizing-coils adapted for various modified forms of arrangement relative to the revoluble metallic armature.

As shown in Figs. 1, 2, and 3, where a disk form of armature 3 is employed the actuating-coils are arranged adjacent to the upper and lower faces thereof. This armature has a central hub, by means of which it is rigidly fixed upon a concentric upright supporting-shaft 2, properly mounted in suitable bearings and having at its upper end a geared connection with a proper registering-train 19 in the usual or other proper manner.

In a proper position adjacent to the upper face of the disk armature 3 is firmly fixed or supported in any proper manner the series or primary coil 4, which is connected in circuit with the generator 15 and the lamps 14 by the leading-out wires 16 and 16' and the return-wire 17. Upon the outer face of the series coil 4 may be wound a coaxial secondary coil 1, which is connected in series with the field-coil 6, hereinafter described, by the wires 12 and 13, as shown in Fig. 1. Adjacent to the lower face of said disk armature is properly fixed and supported a third coil 6, containing a coaxial coil 7, which is connected to the terminals of the series coils 4 by the wires 10 and 11. A resistance 8 is placed in series with the coil 7, and an impedance-coil 9 is placed in series with the said coil 6 for the purpose hereinafter described. An iron core $16^2$, Fig. 3, may be employed in conjunction with the said actuating-coils 6 and 7 for the purpose of varying the speed of rotation of the armature. This is done in either of two ways—viz., by a vertical adjustment of said core into or about the said coils 6 and 7 or by a horizontal adjustment of said core to or from the axis of rotation of said armature. I can employ a cylindrical armature instead of a disk with equal facility. In Figs. 4, 5, and 6 the generator 15 is shown as supplying current to the lamps 14 through the series coils 4 in parallel, though they may be joined up in series. The said coils 6 and 7 may be coaxially wound upon the inner core $16^2$ and rigidly fixed within the said cylindrical armature, as shown in Fig. 4, in which modified arrangement the said coils receive their currents from the transformer 5 and the terminals of the series coils 4. A single coil 6 may be employed upon the said core 16², omitting the said coil 7, as shown in Fig. 5, and is supplied with currents from the secondary 21 of the series transformer 5 and also from the terminals of the series coils 4. These two currents through the said coil 6 form a common resultant and produce a field that is ninety degrees from the field produced by the coil 4. The said coils 6 and 7 may be given a multipolar construction and arranged within the cylindrical armature, as shown in Fig. 6, and supplied with current in the manner described. This latter construction I have found is a very efficient and satisfactory one.

Obviously a multipolar arrangement of the series coils and numerous other modifications come within the spirit and scope of my invention. As shown in Fig. 7, the series coils 4 may be mounted upon the diametrically opposite pole-pieces of the iron 18, having a third pole-piece midway its ends, as shown. In the arrangement shown in Fig. 8 the coil 6 receives its currents by induction from the series coils 4 by being wound upon the iron core 18, which they are represented as magnetizing. The said iron core 18 may be given the modified construction shown in Fig. 9, in which it is provided with four inwardly-projecting pole-pieces ninety degrees apart, on two of which diametric pole-pieces the series coils are wound. The said coils 6 and 7 receive their currents from the transformer 5, as above described.

The operation of my improvement thus briefly described is best understood by reference to Fig. 1. An alternating current traversing the series coil 4 causes it to act as a primary upon the coaxial coil 1, inducing secondary currents therein. These secondary currents flow through and energize the said coil 6, arranged upon the opposite side of the armature. The coil 7 coaxial with the said coil 6 receives its currents from the terminals of the series coils 4 by being shunted around it by the connecting-wires 10 and 11. The secondary current through the coil 6 lags behind the current through the series coils 4 between ninety and one hundred and eighty degrees, while the current flowing through the coil 7 from the terminals of the series coil lags behind said current in the series coil 4 less than ninety degrees. It follows, therefore, that adjusting the relative phase of each a resultant field can be maintained that is exactly ninety degrees behind the field produced by the said series coil. This is done by the adjustment of the impedance-coil 9 in series with the said coil 6 and of the resistance 8 in series with the coil 7. As the current passing through the coil 6 and the current through the coil 7 each forms a magnetic field the combination of said fields or mutual coöperation of said coils 6 and 7 form a resultant field parallel to but in eccentric relation to the field established by the series coil 4. These two fields form a resultant shifting field which actuates the armature.

In Figs. 2, 3, 4, 5, 6, 7, and 9 the said secondary coil is shown as energized by induction from the primary of a series transformer 5, connected in the same circuit which supplies the energy to the series coil 4 instead of having its currents induced by said coil 4. Obviously the torque produced by the arrangement will vary as the square of the current through the series coil 4, and in order to have the speed of the revoluble armature proportional to the currents through the coil 4 a drag or retarding device must be applied to the armature or spindle, the retardation of which must vary as the square of the revolutions. This may be effected in the usual manner by the use of a winged fan in air or liquid.

What I desire to secure by Letters Patent is—

1. In a meter for measuring alternating currents the combination of a revoluble closed armature; a series coil in inductive relation to said armature; a secondary coil receiving currents by induction from the current supplying the translating devices and differing in phase from the current in the said series coil; and a third coil arranged coaxially with the said secondary coil and receiving its currents from the terminals of the said series coil.

2. The combination in an induction-motor meter of a series field carrying the current to be measured; a revoluble armature in inductive relation to said field; a series transformer; a secondary field-coil receiving currents from the said series transformer; and a third coil in coaxial arrangement with the said secondary coil, and adapted to receive currents in shunt to the said series field-coil; and a registering-train operatively connected with the said armature.

3. In an induction-motor meter, the combination of a series field-coil; a compound field-coil comprising two coils in coaxial relation, one of which is adapted to receive currents by induction from the current supplying the translating devices, and the other adapted to receive current from the terminals of the said series coil, and a closed revoluble metallic armature interposed between the said series and compound coils and adapted to be actuated thereby.

4. A series field-coil carrying the main current; a secondary coil energized by induction by the current supplying the translating devices; a third coil coaxially related to the said secondary coil and shunted around the terminals of said series field-coil, the said secondary and said third coils having a common axis in parallel relation to the axis of said series field-coil but eccentric thereto; and a closed revoluble armature in inductive relation to said coils.

5. A series coil; a secondary coil receiving its current by induction from the main current, and whose current differs in phase from the current in said series coil; a third coil in coaxial relation to said secondary coil and adapted to receive its currents from the terminals of the said series coil; a closed revoluble armature in inductive relation to said coils and adapted to be actuated thereby; a registering-train operatively connected with said armature; and means for adjusting the phases of the said secondary and secondary series coils.

6. A series coil; a secondary coil receiving its currents by induction from the series or main current, and whose current differs in phase from the current in said series coil; a third coil in coaxial relation to said secondary coil and adapted to receive its currents from the terminals of the said series coil; a close revoluble armature in inductive relation to said coils and adapted to be actuated thereby; a registering-train operatively connected with said armature; an ohmic resistance in series with the said third coil; and an inductive resistance in series with the said secondary coil.

7. In a motor-meter a series field-coil; a compound field-coil comprising two coils in coaxial relation, one of which is adapted to receive currents by induction from the main current, and the other adapted to receive currents from the terminals of the series coil, a closed revoluble metallic armature interposed between the said series and compound coils, and adapted to be actuated thereby; and a vertically-adjustable iron core in conjunction with the said compound coil, for the purpose of varying the speed of said armature.

Signed by me, at Fort Wayne, in the county of Allen and State of Indiana, this 10th day of March, A. D. 1898.

THOMAS DUNCAN.

Witnesses:
CAROLYN LUND,
EVELYN BARR.